3,506,110
ACCUMULATOR
Lowell A. Paul and Loyd Adams, Pasadena, Calif., assignors to Aeroceanic Corporation, a corporation of California
Filed Aug. 7, 1967, Ser. No. 658,790
Int. Cl. B65g 47/44
U.S. Cl. 198—75      6 Claims

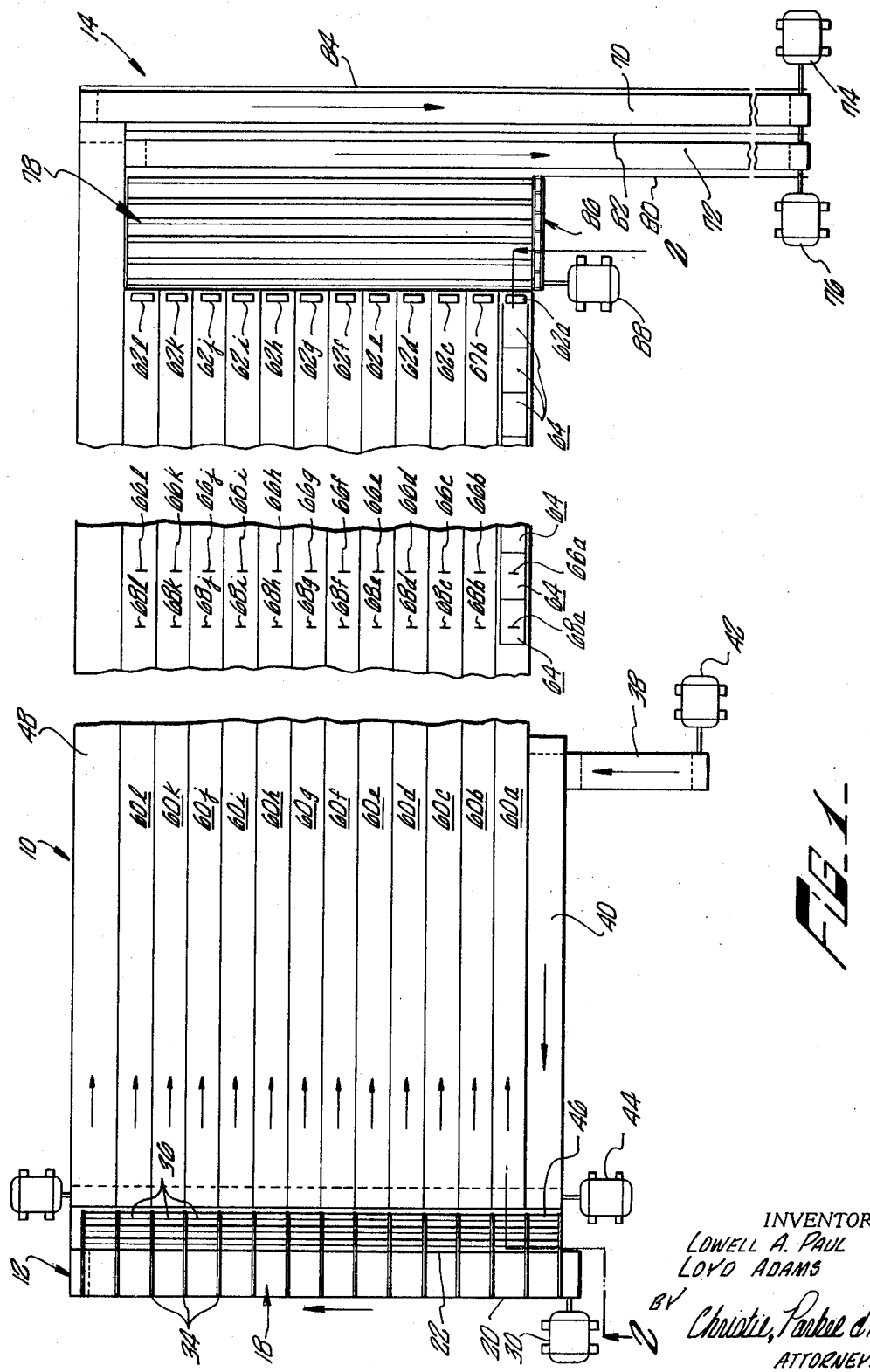

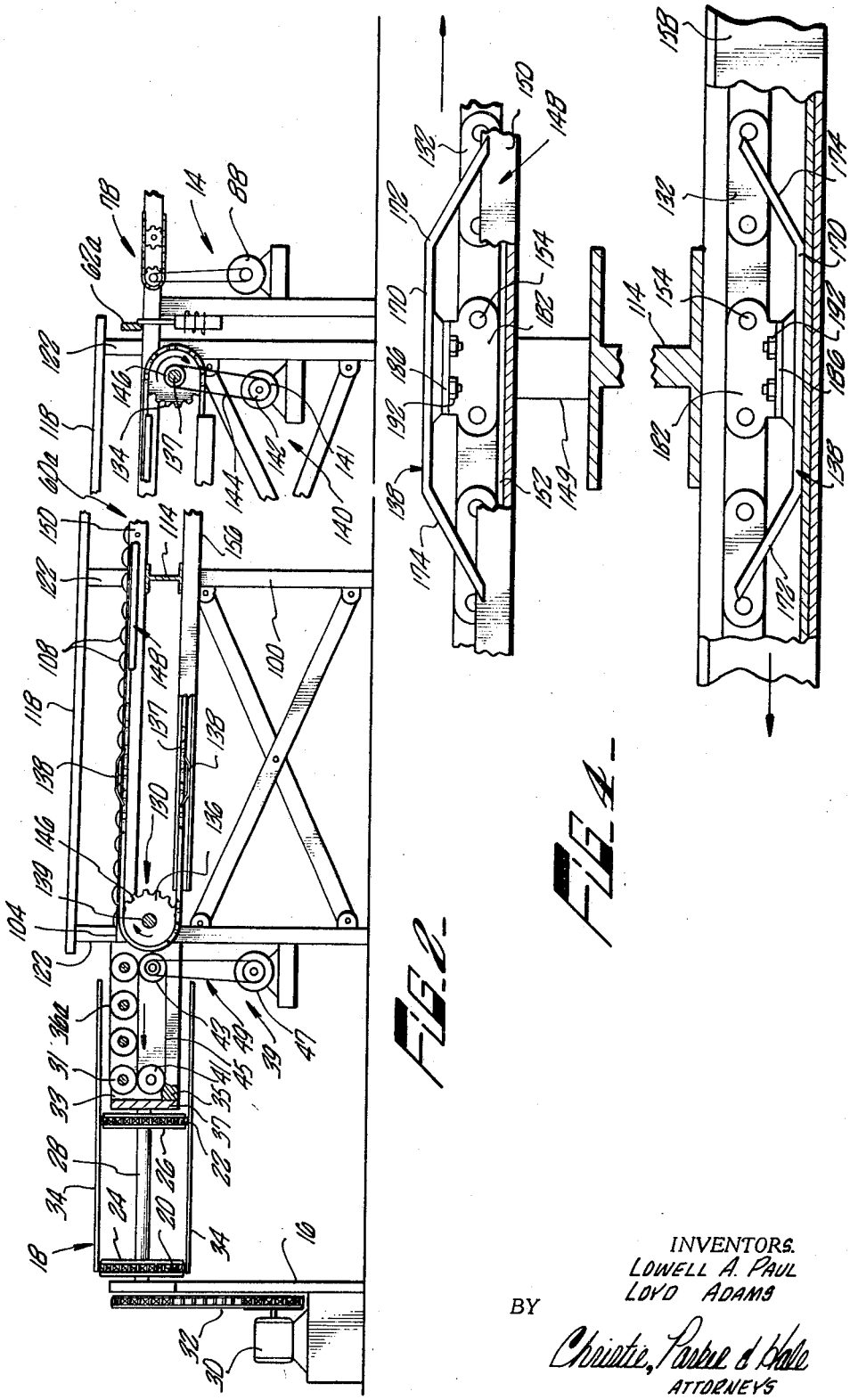

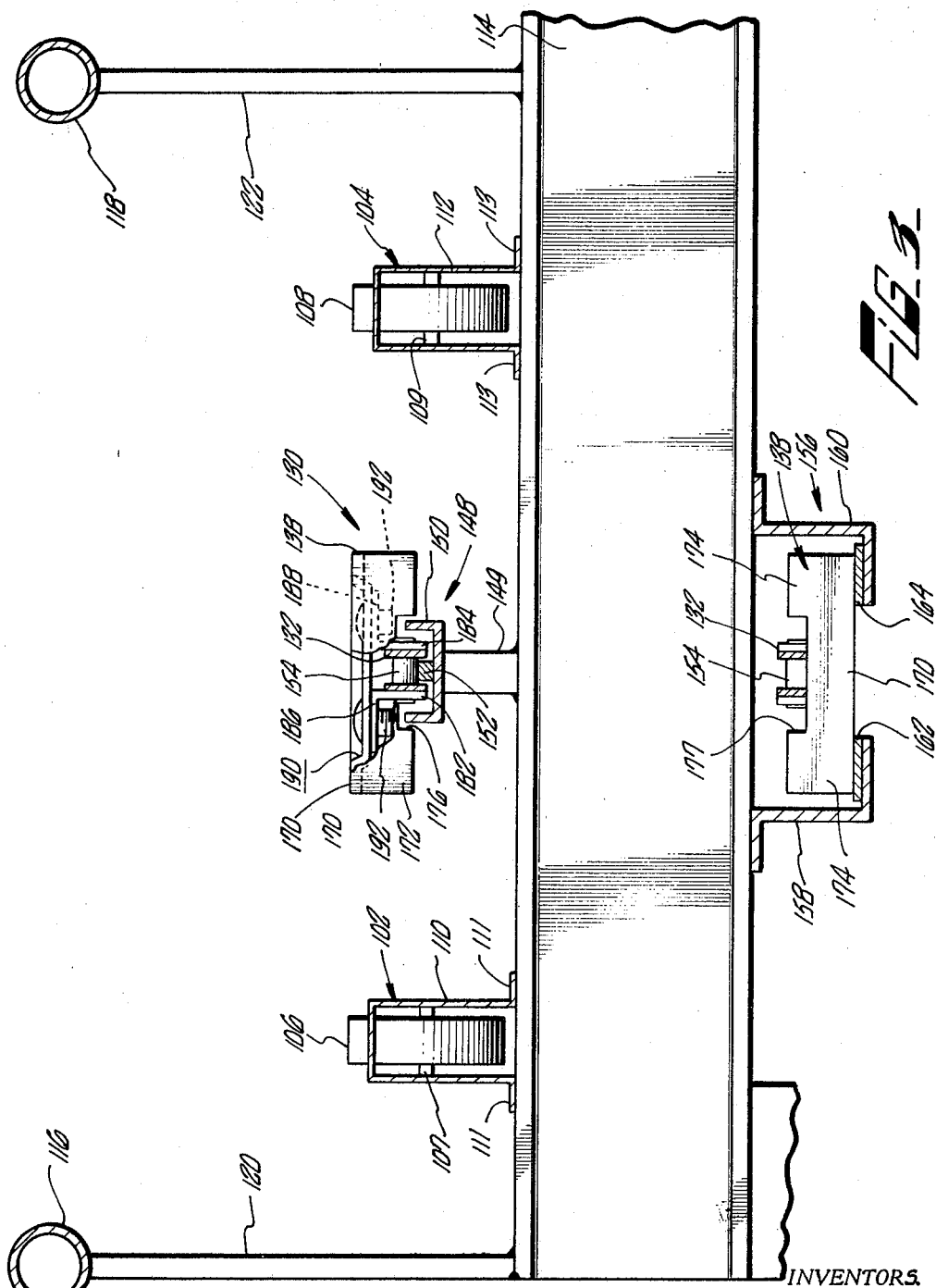

ABSTRACT OF THE DISCLOSURE

Side-by-side accumulator conveying sections including pairs of spaced-apart roller banks are arranged at a slight slope from a source of articles towards an article distributing point. An endless conveyor is associated with each conveying section to transport articles along the sections. A plurality of spaced-apart drag plates is in turn carried by each of the endless conveyers. These drag plates have the facility to frictionally engage the bottom of articles and thereby transport the articles towards the distributing point. The drag plates are spaced apart such that the frictional engagement of one article will carry leading but unengaged articles.

BACKGROUND OF THE INVENTION

This invention relates to the art of materials handling and, more in particular, to an improved accumulator for transporting and accumulating articles such as cartons.

Accumulators are extensively used in material handling industries to transport cartons and the like from an article classification and indexing apparatus to an article distributing apparatus. The article classification and indexing apparatus typically receives cartons containing various classifications of goods and transports them to various output stations where the classified articles are discharged onto the accumulator.

The accumulator has side-by-side conveying sections. Each section receives a given classification of articles and transports them towards the article distributing apparatus. The accumulator also stores articles until it is time for their discharge onto the article distributing apparatus. Thus, the accumulator acts as a storage device for receiving classified articles from the article classification apparatus and for discharging these article at periodic intervals onto the article distributing apparatus.

The conveying sections of prior art accumulators may be classified into four general types. The first type employs rollers on a slope to allow articles to travel by gravity from the article classification apparatus towards the distributing apparatus. The second type employs energized rollers to transport articles. A third type employs a continuous chain conveyer and relies upon friction between the conveyed articles and the chain to transport the articles from the classification point to the distributing area. Finally, some conveyer sections employ what is known in the trade as "zero pressure rollers." Zero pressure rollers employ a lane of rollers and an endless belt which has spaced-apart tabs that regularly contact each of the rollers. The tabs contact each of the rollers in succession with a small amount of force to impart a slight amount of energy to them for article conveying purposes.

The gravity feed type accumulator conveying section has not proven satisfactory in many respects. Among its disadvantages is the fact that with long accumulators the elevation at the input of the accumulator must be large relative to the elevation at its output. But perhaps the biggest disadvantage lies in the fact that there is no positive control over the articles conveyed. An article received by the gravity feed roller will progress by gravity towards the distribution point imparting angular momentum to each of the rollers in its path. Because of the energy required to impart this momentum the article travels at a relatively slow speed. Successive articles discharged onto the rollers, however, will not have to overcome the rollers' inertia and will therefore catch up with the lead article. As more and more articles are discharged onto the rollers, their progressive rate of travel across the conveying section will increase because progressively less energy is required to move across the rollers. A series of cartons, then, can translate the entire length of the conveying section at a rapid rate of speed and, when arrested for storage, the leading cartons will feel a substantial force produced by the rapid deceleration of the trailing cartons. This force often causes rupture of the cartons.

The incidence of carton rupture associated with the gravity feed type accumulator conveying sections is not materially reduced when the conveying sections are operated by energized rollers. As cartons come to a stop for their accumulation the energized rollers will impart a force to each carton which is ultimately felt by the first in line. This force is often substantial enough to cause carton rupture.

The same rupture problem is present in the chain friction type conveying sections because each article experiences a driving force towards the distributing point whether the sections are accumulating or discharging. In addition, this type of conveying action relies upon a very small area of contact between the chain and the articles transported by the chain. Deviations from optimum underside geometry in the conveyed articles can, therefore, result in insufficient contact between the article and the chain, resulting in halting motion at best of the article along the length of the accumulator section. Because of this problem, chain friction conveying sections are normally used with specialized articles. Moreover, in both the energized roller and friction type conveying sections a considerable amount of power is used because the conveying sections are always energized and must pass under articles which are being stored.

The zero pressure roller system avoids the problem of crushed boxes because very little force is exerted by the tabs on the rollers. However, the force is so low that one carton cannot overcome the inertia of a leading carton. This means that when it is time to discharge an accumulated lane or section of articles onto the distributing apparatus the lead article must be accelerated directly by a tab passing under its rollers. Inasmuch as the tabs are spaced apart, it may take as much as thirty seconds after the particular conveying section receives a discharge signal before actual discharge begins. Particularly in large accumulators handling large quantities of articles, this time delay can represent substantial diminution in the materials handling ability of the system.

SUMMARY OF THE INVENTION

The present invention provides an improved accumulator which avoids the problem of crushed articles, provides positive control of the rate of speed of articles along each individual conveying section, and provides rapid discharge of articles accumulated onto the distributing apparatus normally associated with accumulators.

The present invention provides an accumulator which has a plurality of side-by-side conveying sections with each of the conveying sections being capable of accepting articles from a source of articles such as an article classification and indexing apparatus. Each conveying section is also capable of discharging articles onto an article distributing device or apparatus. Means are provided for selectively arresting the motion of articles in each of the conveying sections before entrance into the distributing device in order to accumulate articles in the conveying sections. Each conveying section has an endless conveyor extending substantially its entire length. Means are provided for driving each of the endless conveyers. A plurality of spaced-apart drag plates are carried by each of the endless conveyers. Each drag plate has an engaging portion which is capable of engaging the bottom of an article in the path of the moving drag plate. The frictional engagement is such that an article will be conveyed by the drag plate towards the article distributing apparatus and pick up leading articles disposed between the engaged article and the next leading drag plate. Thus, when article discharge onto the distributing apparatus occurs, discharge will commence without a time lag. The drag plates are also capable of sliding under articles held by the arresting means.

In preferred form, the drag plates have a leading portion which depends at an angle away from the engaging portion towards the drag plate's associated endless conveyer. The leading portion prevents fouling of the endless conveyer by carton flaps and the like. To further increase resistance to conveyor fouling, the leading portion may be configured to straddle the conveyor. Similar protection against fouling may be provided by a trailing portion which depends from the engaging portion towards the endless conveyer.

To maintain proper orientation between the drag plates and the bottom sufaces of articles disposed on the drag plates, a track is preferably provided that runs the length of each conveying section. The track supports the endless conveyer such that it and its carried drag plates will always be in proper position relative to the articles.

It is preferred to use an endless roller chain as the endless conveyer. One of the salient advantages of using a chain is that its support in the track may be accomplished by a bar disposed in the track in position to contact the roller chain's rollers. This form of support maintains proper chain and drag plate orientation without substantial friction loss between the chain and the track.

It is also preferred to support articles on each conveying section by a pair of substantially parallel and spaced-apart banks of rollers. The endless conveyor passes between each bank of rollers with article transport being accomplished solely by the action of the drag plates to provide positive control. The banks of rollers may be oriented on a slight downward slope from the carton source to the distributing device to augment the action of the drag plates in transporting cartons. The slope, however, is limited to avoid gravity transport.

The improved accumulator of the present invention provides positive transporting action on articles without the hazard of damage due to crushing. In addition, discharge from each conveying section of the accumulator onto an article distributing device is accomplished rapidly. These features are a product of the unique drag plate. The frictional engagement between the drag plate and an article is sufficient to transport the article and leading articles not engaged by drag plates. This feature is particularly significant when article discharge onto the distributing apparatus occurs. At the moment the arresting means is released, a drag plate may not be in position under the leading article in a lane of accumulated articles. Its position may be several cartons away from the leading article. Nonetheless, the drag plate will pick up the article on top of it and, through frictional engagement with this article, force leading articles onto the distributing device. However, the force acting between articles is relatively low because of the spacing of the drag plates. This force is no more than the frictional force between a drag plate and an engaged article. Therefore, the incidence of article crushing is materially reduced. The simplicity of the drag plate type conveying section of this invention also reduces the cost of positive controlled accumulators without sacrificing their desirable features.

These and other features, aspects and advantages of the present invention will become more apparent from the following description, appended claims and drawings.

BRIEF DESCRIPTION OF THE FIGURES

FIGURE 1 is a plan view illustrating schematically the improved accumulator in conjunction with an article classification apparatus and an article distributing apparatus;

FIGURE 2 is an elevational, sectional view taken along lines 2—2 of FIGURE 1 showing in greater detail the preferred accumulator of this invention;

FIGURE 3 is a view taken along line 3—3 of FIGURE 2 showing a preferred accumulator section looking towards the source of cartons; and FIGURE 4 is a partial side elevation, partly in section, showing the preferred drag plates and tracks of the present invention.

DESCRIPTION OF THE PREFERRED EMBODIMENTS

FIGURE 1 illustrates schematically the relationship between the preferred accumulator of the present invention and the materials handling apparatus which are normally used with the accumulator. In the figure, the accumulator is shown in general by reference numeral 10. The article classifying apparatus is shown by reference numeral 12 and the article distributing apparatus is shown by reference numeral 14. The article classifying and the article distributing apparatus do not form a part of the present invention as such but a brief description of their workings is presented for a thorough understanding of accumulator 10.

Article classifying apparatus 12 is shown schematically in FIGURE 1 and in somewhat greater detail in FIGURE 2. The apparatus includes a frame 16 which supports an endless conveyer 18. The conveyer includes a pair of endless chains 20 and 22 which are driven by sprockets 24 and 26, respectively. The chains pass over idler sprockets at the rear end of apparatus 12. These sprockets are not shown. Sprockets 24 and 26 are mounted together through a shaft 28. A motor 30 on frame 16 is coupled to sprockets 24 and 26 through a chain drive 32. Chains 20 and 22 carry a plurality of spaced-apart arms 34. These arms in turn pass over a plurality of output stations 36. Station 36 illustrated in FIGURE 2 is typical of all the output stations. This station includes a series of energized rollers 31 which are journaled in a pair of mounting plates 33 and 35. The mounting plates form a part of frame 16 and are attached to side plate 37 in which sprocket 26 is journaled by shaft 28. Mounting plate 35 is only partially shown in the figure to facilitate illustration. The mounting plates are attached at their other ends to the frame of the conveying sections to complete the support of apparatus 12. Rollers 31 are driven by drive 39. Drive 39 includes idler pulley 41, drive pulley 43 and belt 45. Belt 45 contacts the lower surface of rollers 31. A motor 47, through a belt drive 49, completes the power train to the rollers by driving pulley 43.

Articles are introduced into sorting apparatus 12 by a pair of standard input conveyers 38 and 40 which are respectively driven by motors 42 and 44. The articles are discharged from conveyer 40 into input station 46. Articles reaching station 46 are swept by arms 34 across the various of the output stations 36 where, according to their particular classification, they are discharged onto accumulator 10. The last output station of article classifying apparatus 12 is usually a miscellaneous station for oddly classified articles. Articles discharged from this station pass to article distributing apparatus 14 on a conveyer 48. Conveyer 48 is powered by a motor 50.

Accumulator 10 includes a plurality of side-by-side conveying sections which are indicated by reference numerals 60(a) through 60(l). These conveying sections receive articles classified by sorting apparatus 12 for accumulation on the conveying sections and ultimately for discharge onto distributing apparatus 14. A plurality of article arresting means or gates 62(a) through 62(l) inclusive, are provided for the accumulating action. These gates may be solenoid operated as seen in FIGURE 2. Articles such as cartons are arrested by the gates prior to discharge onto distributing apparatus 14. This is shown by the series of cartons 64 on conveying section 60(a). When carton accumulation is sufficient for discharge onto distributing apparatus 14, gate 62(a) opens in response to the closure of a pair of limit switches 66(a) and 68(a). Each of the article conveying sections has a set of these limit switches. The limit switches are shown schematically by the vertical dash lines in FIGURE 1.

Article distributing apparatus 14 includes a pair of endless conveyers 70 and 72 which are disposed laterally of the conveying sections and are powered respectively by motors 74 and 76. Conveyer 70 receives articles from miscellaneous accumulator conveying section 48, while conveyer 72 receives the classified articles accumulated by accumulator 10 in conveying sections 60(a) through 60(l). Accelerating rolls 78 receive articles discharged from accumulator 10 and discharge these articles onto conveyer 72. Accelerating rolls 78 operate at a faster rate than the rate of linear travel imparted to articles by each of the conveying sections. Representative rates are 90 feet per minute for the accelerating rolls and 30 feet per minute for the conveying sections. Side rails 80 and 82 prevent articles from falling off conveyer 72, while an additional side rail 84 cooperates with rail 82 to effect the same purpose for conveyer 70. Accelerating rolls 78 are driven by a sprocket and chain drive 86. Sprocket and chain drive 86 is in turn driven by a motor 88.

With the foregoing description in mind, accumulator 10 will be described in greater detail and with particular reference to the means of conveying articles from article classifying apparatus 12 to article distributing apparatus 14. This description will be limited to conveying section 60(a), inasmuch as the remaining sections are identical in structure, function and operation.

Conveying section 60(a) includes a frame 100 which supports two parallel banks of rollers 102 and 104. These rollers are mounted on a slope. As is seen in FIGURE 2, the slope is downward from material sorting apparatus 12 and towards article distributing apparatus 14. The amount of slope is limited to a value where article transport does not occur by the slope alone. In a conveying section 90 feet long, for example, a slope produced by a difference of 20 inches in elevation along the conveying section between the article classifying apparatus and the article distributing apparatus has proven adequate. Each bank of rollers includes a plurality of serially disposed rollers 106 and 108. Each roller is individually journaled in roller housings 110 and 112 on shafts 107 and 109. Shafts 107 and 109 are mounted in the vertical walls of the housing. Each housing has a generally rectangular cross section with a pair of laterally extending flanges for their mounting. These flanges are denominated by reference numerals 111 and 113 for housings 110 and 112 respectively. Housings 110 and 112 are mounted through their flanges on cross beams regularly placed along the length of conveying section 60(a) on frame 100. One such cross beam is shown by reference numeral 114 in FIGURES 2 and 3. The banks of rollers are flanked by guide rails 116 and 118 which prevent errant excursions of articles from their appropriate conveying section. Each of the guide rails is supported by regularly spaced uprights 120 and 122 which are mounted on the regularly placed cross beams.

Conveying section 60(a) includes an endless conveyer assembly 130. Endless conveyer assembly 130 includes an endless chain 132, a drive sprocket 134, an idler sprocket 136 and a plurality of regularly spaced drag plates 138. The drive and idler sprockets are journaled to frame 100 on shafts 137 and 139. Drive sprocket 134 is driven by drive 140. Drive 140 includes a motor 141, drive pulley 142, a belt 144 and a driven pulley 146. Motor 141 is mounted on frame 100 and drives pulley 142. Pulley 142, in turn, drives pulley 146 by belt 144. Pulley 146 is locked to drive sprocket 134 through shaft 137.

To maintain the proper position of drag plates 138 with respect to cartons which they transport from article classification apparatus 12 towards article distributing apparatus 14, endless chain 132 is mounted in a track. The track is shown by reference numeral 148. The track is supported on cross beams 114 by upright mounting members 149. Track 148 includes a continuous channel 150 and a bar 152. Bar 152 extends for substantially the entire length of channel 150 and is attached to the horizontal portion of the channel. The bar serves to support the rollers between the links of endless chain 132. The contact between the rollers and bar 152 minimizes friction loss created by the motion of the chain. This relationship is shown to the best effect in FIGURE 3 wherein roller 154 rests on bar 152.

Chain 132 is also supported in its return from sprocket 136 to drive sprocket 134. Support is provided through guide assembly 156 which is secured to cross members 114 of frame 100. Guide assembly 156 includes rail mounting members 158 and 160 which depend downwardly from the attachment to cross members 114 and then horizontally inward towards one another. Brackets 158 and 160 support rails 162 and 164 which are mounted on the horizontal portions of the bracket. These rails may be fabricated from wood or the like and serve to support chain 132 by direct support of drag plates 138.

Drag plates 138 will now be described with particular reference to FIGURES 3 and 4. Each drag plate has a carton engaging portion 170, a leading portion 172 and a trailing portion 174. The upper surface of carton engaging portion 170 is realtively extensive for its frictional engagement of articles. Engaging portion 170 is slightly higher than the upper contacting surface of rollers 106 and 108 to obtain the frictional engagement. The leading and trailing portions depend at acute angles from article engaging portion 170. In addition, the leading and trailing portions straddle the lateral sides of channel 150 to prevent fouling of chain 132 by, for example, loose carton flaps. Straddling is provided by the shallow U-shaped cutouts shown in FIGURE 3 by reference numeral 176 in leading portion 172 and by reference numeral 177 for trailing portion 174.

The drag plates include individual links of chain 132. A standard chain link is modified by forming it with an L-shaped bracket extension for coupling the remainder of the drag plate to the chain. The modified link is commercially available. Thus, links 182 and 184 extend upwardly and then at right angles into horizontal sections 186 and 188 respectively. Carton engaging surface 170 has a small recessed portion 190. Fasteners 192 extend through recess portion 190 and connect the horizontal portions of links 182 and 184 to the balance of the drag plates.

In operation, articles such as cartons classified by classifying apparatus 12 are discharged into conveying sections 60(a) through 60(l) by the action of the output stations 36. These cartons will be supported by roller banks 102 and 104 and the individual rollers 106 and 108. Continuous chain 132 carries each of drag plates 138 into position under cartons on the roller banks. One of these drag plates will frictionally engage each of the cartons 64 and transport each one down conveying section 60(a) towards distributing apparatus 14. Typically, gate 62(a) will be elevated to arrest the motion of the cartons. Drag plate 138 will carry the carton as far as it can, for example, to gate 62(a). Subsequent cartons will also be picked up by subsequent drag plates and transported towards gate 62(a). When the conveying section is full, as is indicated by limit switches 66(a) and 68(a), gate 62(a) will lower. An individual one of the drag plates at this particular moment may, for example, be under the third carton from gate 62(a). The drag plate will pick up this third carton and transport it and the two preceding cartons to accelerator rolls 78 which in turn transports them to conveyor 72 for distribution. The drag plates are spaced apart a sufficient distance, for example 10 feet, to directly carry only a few of the series of cartons. Unengaged cartons will, however, be picked up by engaged cartons. Thus, it does not make any difference where the drag plates are in relation to the cartons when discharge occurs into distributing apparatus 14, insofar as the time required to effect discharge of accumulated cartons is concerned. This feature prevents any crushing force on leading cartons because the forces acting on a series of cartons towards the gate will be relatively low. Nonetheless, the force is sufficient to effect rapid carton discharge. While gate 62(a) is up, the drag plates will slide under arrested cartons.

What is claimed is:

1. In an accumulator, an improvement in the means for transporting and accumulating cartons or the like comprising:
   (a) a frame;
   (b) an endless conveyor on the frame extending between a carton input point and a carton discharge point;
   (c) means for driving the endless conveyor in a direction to transport cartons from the input point to the discharge point;
   (d) a track on the frame extending continuously between the input point and the discharge point, the endless conveyor being supported by the track between the input point and the discharge point;
   (e) means for supporting cartons between the input point and the discharge point;
   (f) means for selectively arresting cartons at the discharge point; and
   (g) a plurality of spaced-apart drag plates each having a plate-like carton engaging portion, a trailing portion and a leading portion, the drag plates being directly attached to the endless conveyor at their carton engaging portions such that the carton engaging portions pass between the input point and the output point to frictionally engage cartons in their path and to slide under cartons held by the arresting means, the spacing between individual drag plates being at least two carton lengths to enable transport of at least two cartons with one drag plate, such transport being effected by frictional engagement of the trailing of the two cartons by a drag plate and the leading of the two cartons being pushed by the engaged carton, the trailing and leading portions depending at an acute angle from the engaging portion, the leading portion straddling the endless conveyor and the track through a cutout therein, each of the cutouts having an edge between the conveyor and the engaging portion.

2. The improvement claimed in claim 1 wherein the endless conveyor includes an endless roller chain with the drag plates being carried by the chain, and the track includes a bar disposed to support the chain by contact with the chain's rollers.

3. The improvement claimed in claim 1 wherein the support means includes a pair of substantially parallel and spaced-apart banks of rollers disposed to support by rolling contact cartons transported by the drag plates, the endless conveyor being disposed between the banks of rollers.

4. The improvement claimed in claim 3 wherein the banks of rollers have a slight downward slope from the input point to the discharge point, the slope being such as to augment the action of the drag plates in transporting cartons but being limited such that cartons are only transported by the action of both the slope and the drag plates.

5. The improvement claimed in claim 4 wherein
   the endless conveyor includes an endless roller chain with the drag plates being attached to the chain;
   the track includes a bar disposed to support the chain by contact with the chain's rollers; and
   a chain return track is included which is disposed to guide the drag plates as they return from the discharge point towards the input point.

6. The improvement claimed in claim 1 wherein the trailing portion of each drag plate straddles the endless conveyor and track through a cutout therein, each trailing portion cutout having an edge between the conveyor and the engaging portion.

References Cited

UNITED STATES PATENTS

| 1,856,733 | 5/1932 | Shepherd | 198—19 |
| 2,942,718 | 6/1960 | Buhrer | 198—32 |
| 2,132,455 | 10/1938 | Bishop | 198—170 |
| 2,793,736 | 5/1957 | Thomson | 198—127 |
| 2,990,941 | 7/1961 | Peras | 198—170 |

RICHARD AEGERTER, Primary Examiner

U.S. Cl. X.R.

198—160